United States Patent
McCarthy et al.

(10) Patent No.: US 12,486,922 B1
(45) Date of Patent: Dec. 2, 2025

(54) VALVE ACTUATION ASSEMBLY WITH A CABLE AND SHAFT

(71) Applicant: Halliburton Energy Services, Inc., Houston, TX (US)

(72) Inventors: Finn Gamble McCarthy, Carrollton, TX (US); Ryan W. McChesney, Carrollton, TX (US); Stephen Michael Greci, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/768,964

(22) Filed: Jul. 10, 2024

(51) Int. Cl.
  *E21B 34/14* (2006.01)
  *F16K 5/06* (2006.01)
  *F16K 31/46* (2006.01)

(52) U.S. Cl.
  CPC ............ *F16K 31/465* (2013.01); *E21B 34/14* (2013.01); *F16K 5/0652* (2013.01)

(58) Field of Classification Search
  CPC ..... E21B 34/14; E21B 2200/04; F16K 31/465
  See application file for complete search history.

(56) References Cited

U.S. PATENT DOCUMENTS

| | | | | |
|---|---|---|---|---|
| 225,371 A | * | 3/1880 | Hassinger | B62C 5/04 278/102 |
| 591,554 A | * | 10/1897 | Kesty | F23N 3/06 236/26 B |
| 1,095,295 A | * | 5/1914 | Stevens | F16K 31/44 251/294 |
| 2,965,313 A | * | 12/1960 | Jay | F16K 5/0407 251/207 |
| 3,710,860 A | * | 1/1973 | Holbert, Jr. | E21B 34/02 166/321 |
| 4,619,325 A | * | 10/1986 | Zunkel | E21B 34/103 166/387 |
| 8,960,270 B2 | | 2/2015 | Sevre et al. | |
| 8,960,287 B2 | | 2/2015 | Holderman et al. | |
| 2010/0096119 A1 | | 4/2010 | Sevre et al. | |
| 2014/0116717 A1 | | 5/2014 | Guven et al. | |
| 2020/0080397 A1 | * | 3/2020 | Walker | F16K 5/0652 |

FOREIGN PATENT DOCUMENTS

| | | |
|---|---|---|
| CN | 102865051 A | 1/2013 |
| CN | 218894999 U | 4/2023 |

OTHER PUBLICATIONS

International Search Report and Written Opinion for International Patent Application No. PCT/US2024/039634 dated Apr. 4, 2025. PDF file. 10 pages.

* cited by examiner

*Primary Examiner* — Cathleen R Hutchins
(74) *Attorney, Agent, or Firm* — Scott Richardson; C. Tumey Law Group PLLC (57) ABSTRACT

A variety of methods, systems, and apparatus are disclosed, including, in one embodiment, a valve system comprising: a valve; and a valve actuation assembly comprising: a linear motion actuator configured to move linearly; a cable coupled to the linear motion actuator; and a shaft coupled to the cable, wherein the cable extends from the linear motion actuator to the shaft, wherein the shaft is configured to rotate and actuate the valve in response to linear movement of the linear motion actuator.

20 Claims, 7 Drawing Sheets

VALVE ACTUATION ASSEMBLY WITH A CABLE AND SHAFT

BACKGROUND

Natural resources such as gas, oil, and water residing in a subterranean formation or zone are usually recovered by drilling a wellbore down to the subterranean formation while circulating a drilling fluid in the borehole. Wellbores may also be drilled for injection of fluids into the subterranean formations. After drilling, completion operations may be performed to make the wellbore suitable for production (or injection). During wellbore operations, servicing fluids may be introduced into a wellbore and/or formation fluids may be recovered from the wellbore. To control the flow of fluids through various flow paths in a wellbore, valves may be installed downhole. Example valves may include ball valves and gate valves, among others. The assemblies for actuation of these valves should be strong enough to withstand hydrostatic pressures encountered in a downhole environment while also transferring motion to the valve for actuation.

BRIEF DESCRIPTION OF THE DRAWINGS

These drawings illustrate certain aspects of some of the embodiments of the present disclosure and should not be used to limit or define the disclosure.

DETAILED DESCRIPTION

Disclosed herein are valve systems and, more particularly, example embodiments disclose valve systems for use in subterranean wells that includes a valve actuation assembly for converting linear motion to rotational motion for valve actuation. Advantageously, the valve actuation systems may be able to withstand hydrostatic pressures encountered in a wellbore.

In accordance with some embodiments, the valve actuation assembly may include a cable that cooperates with a shaft to convert linear motion to a rotational motion. The cable may be moved linearly by a piston or other suitable linear motion actuator. The cable may be coupled to the piston on one end and to the shaft on the other end. The shaft may be coupled to the cable on one end and to the valve on the other end. Examples of suitable valves may include ball valves and gates valves, among others. In general, the valve may be any suitable valve that may be actuated by rotation of the shaft. For example, the shaft may be coupled to the ball of a ball valve. In operation, liner movement (e.g., pulling) of the cable should cause the shaft to rotate, which in turns actuates the valve, for example, by rotation of the ball valve from an open position to a closed position.

Figure 1:
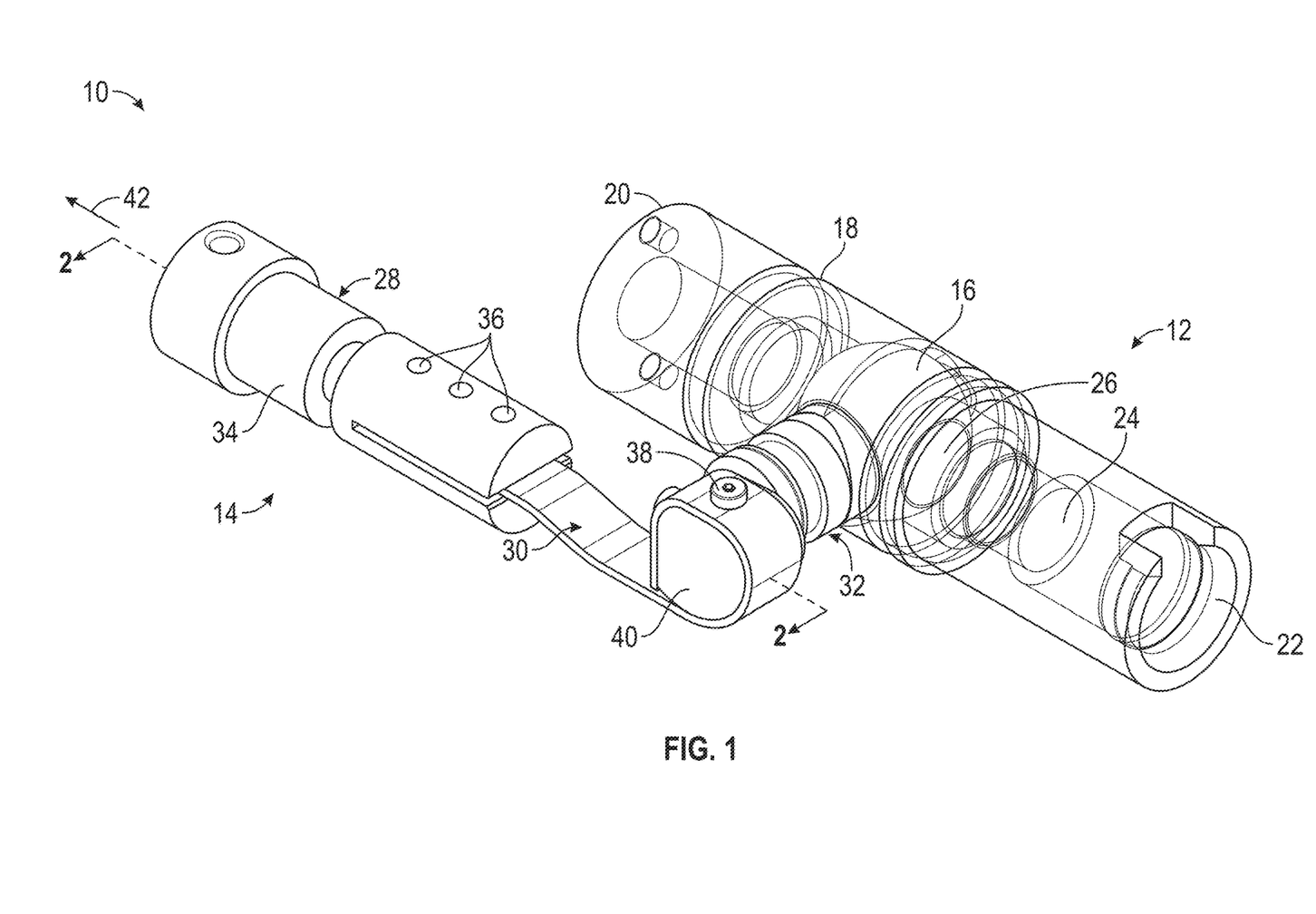
FIG. 1 illustrates a valve system with a valve actuation system for transferring linear motion to rotational motion for actuation of a valve in accordance with some embodiments of the present disclosure.

FIG. 1 illustrates a valve system 10, in accordance with one or more embodiments of the present application. As illustrated, the valve system 10 may include a valve 12 and a valve actuation assembly 14. The valve actuation assembly 14 may be configured to convert linear motion to rotational motion for actuation of the valve 12.

The valve 12 may be any suitable valve that may be actuated by rotation, including a ball valve and a gate valve. In the illustrated embodiment, the valve 12 may include a ball 16 and a valve housing 18. As illustrated, the valve housing 18 may house the ball 16. The valve housing 18 may include an inlet 20 and an outlet 22 with a through passageway 24 coupling the inlet 20 and the outlet 22. The valve 12 may have an open position where a fluid may pass through the valve housing 18 from the inlet 20 to the outlet 22 by way of the through passageway 24. In a closed position, for example, the fluid may be prevented from flowing through the valve 12. For example, the ball 16 may have a ball through bore 26 that can be aligned with the through passageway 24 in an open position to allow flow through the ball 16. The ball 16 may be rotated (e.g., approximately 90 degrees) from the open position with the ball through bore 26 aligned with the through passageway 24 to a closed position where the ball through bore 26 is not aligned with the through passageway 24 such that the ball 16 blocks flow in the through passageway 24.

The valve actuation assembly 14 may be configured to actuate the valve 12. For example, the valve actuation assembly 14 may be configured to rotate the valve from the open position to the closed position. As illustrated, the valve actuation assembly 14 may include a linear motion actuator 28, a cable 30, and an actuation shaft 32. In the illustrated embodiment, the linear motion actuator 28 may be actuated to pull the cable 30. The cable 30 may be associated with the actuation shaft 32 such that linear movement of the cable 30 causes the actuation shaft 32 to rotate.

The linear motion actuator 28 may be any suitable device that can move linearly. Examples of a suitable linear motion actuator 28 may include mechanical actuators, electro-mechanical actuators, hydraulic actuators, pneumatic actuators, piezoelectric actuator, and explosive-actuated devices. In some embodiments, the linear motion actuator 28 may be a hydraulic actuator. For example, the linear motion actuator 28 may include a piston 34 that can be exposed to hydrostatic pressure (e.g., in annulus  of wellbore  on FIG. 8). Accordingly, hydrostatic pressure may be used to cause linear motion of the piston 34. As illustrated, the piston 34 may be coupled to the cable 30. Any suitable technique may be used to couple the cable 30 to the piston 34 including fasteners, clamps, mechanical swaging, wedges, and/or adhesives. In the illustrated embodiment, first fasteners 36 may be used to secure the cable 30 to the piston 34. The first fasteners 36 may include any suitable fasteners, including screws, nails, or other suitable fastener for securing the cable 30 to the piston 34.

The cable 30 may be coupled to the linear motion actuator 28 and the actuation shaft 32. As illustrated, the cable 30 may be at least partially wrapped around the actuation shaft 32. Any suitable technique may be used to couple the cable 30 to the actuation shaft 32 including fasteners, clamps, mechanical swaging, wedges, and/or adhesives. In the illustrated embodiment, second fasteners 38 may be used to couple the cable 30 to the actuation shaft 32. The second fasteners 338 may include any suitable fasteners, including screws, nails, or other suitable fastener for securing the cable 30 to the piston 34. As illustrated, the cable 30 may be secured to, and wrapped at least partially around, a cammed portion 40 of the shaft. When the cable 30 is moved in the direction indicated by arrow 42, the cable 30 may rotate the actuation shaft 32, for example, as the cable 30 unwraps from the actuation shaft 32.

The cable 30 may be constructed from any suitable material for transferring the linear force of the linear motion actuator 28 to the actuation shaft 32. The material should generally allow the cable 30 to be pliable such that it bends during operation without breaking. Examples of suitable materials include metals, aromatic polyamide fibers (e.g., KEVLAR® fibers), carbon fibers, and metal-reinforced fibers, such as metal reinforced aromatic polyamide fibers and metal-reinforced carbon fibers. In some embodiments, the cable 30 may be a sheet metal cable or a metal, wire rope.

In some embodiments, the cable 30 may be a flexible cable, such that it can only transfer sufficient force to the actuation shaft 32 for rotation when pulled and cannot transfer force for rotation when pushed in the opposite direction. Accordingly, the cable 30 when flexible may allow for only a one-time actuation of the valve 12, either open only or close only. For example, it may be desirable to install the valve 12 in an open position then use the valve actuation assembly 14 have the cable 30 that is flexible to close the valve 12. In these embodiments, the valve 12 would remain closed and not need to be closed. In other embodiments, the cable 30 may be stiff to allow motion in both directions. In other embodiments, other mechanisms may be used to allow opening and closing of the valve 12 with a cable 30 that is flexible, for example, more than one of the cable 30 may be used positioned in opposite directions so that pulling one cable 30 closes the valve while pulling the other cable 30 closes the valve, as shown on FIG. 8.

The cable 30 is shown with a flat, rectangular cross-section. The cable 30 is considered flat because it has a smooth surface. The cable 30 also has a cross-section with a width that is much greater than its height, for example, the width is from about 5 times to about 100 times greater than its height. It should be understood that cables otherwise configured can also be used in example embodiments of the linear motion actuator 28. For example, the cable 30 may have a rectangular, square, circular, elliptical, or otherwise formed cross-section.

The actuation shaft 32 may be coupled to the cable 30 and the valve 12. As illustrated, the actuation shaft 32 may be coupled to the ball 16 of the valve 12. The actuation shaft 32 may include a cammed portion 40. In the illustrated embodiment, the cammed portion 40 may be positioned at an end of the actuation shaft 32. However, the cammed portion 40 may be otherwise positioned on the shaft, for example, in a middle portion or proximate an end. As illustrated, the cable 30 may be wrapped at least partially around the actuation shaft 32, for example, at least partially around the cammed portion 40.

Operation of the valve actuation assembly 14 to actuate the valve 12 will now be described with respect to FIG. 1 in accordance with some embodiments of the present invention. In operation, linear motion actuator 28 may be actuated. For example, hydrostatic pressure may be used to move linear motion actuator 28 in the direction shown by the arrow 42. Movement in the direction of arrow 42 should cause the piston 34 to pull the cable 30. As the cable 30 is pulled by the piston 34 in the direction of arrow 42, the cable 30 should unwrap from the actuation shaft 32. Because the cable 30 is attached to the actuation shaft 32, the actuation shaft 32 should rotate as the cable 30 moves in the direction of arrow 42, unwrapping from the actuation shaft 32.

Figure 2:
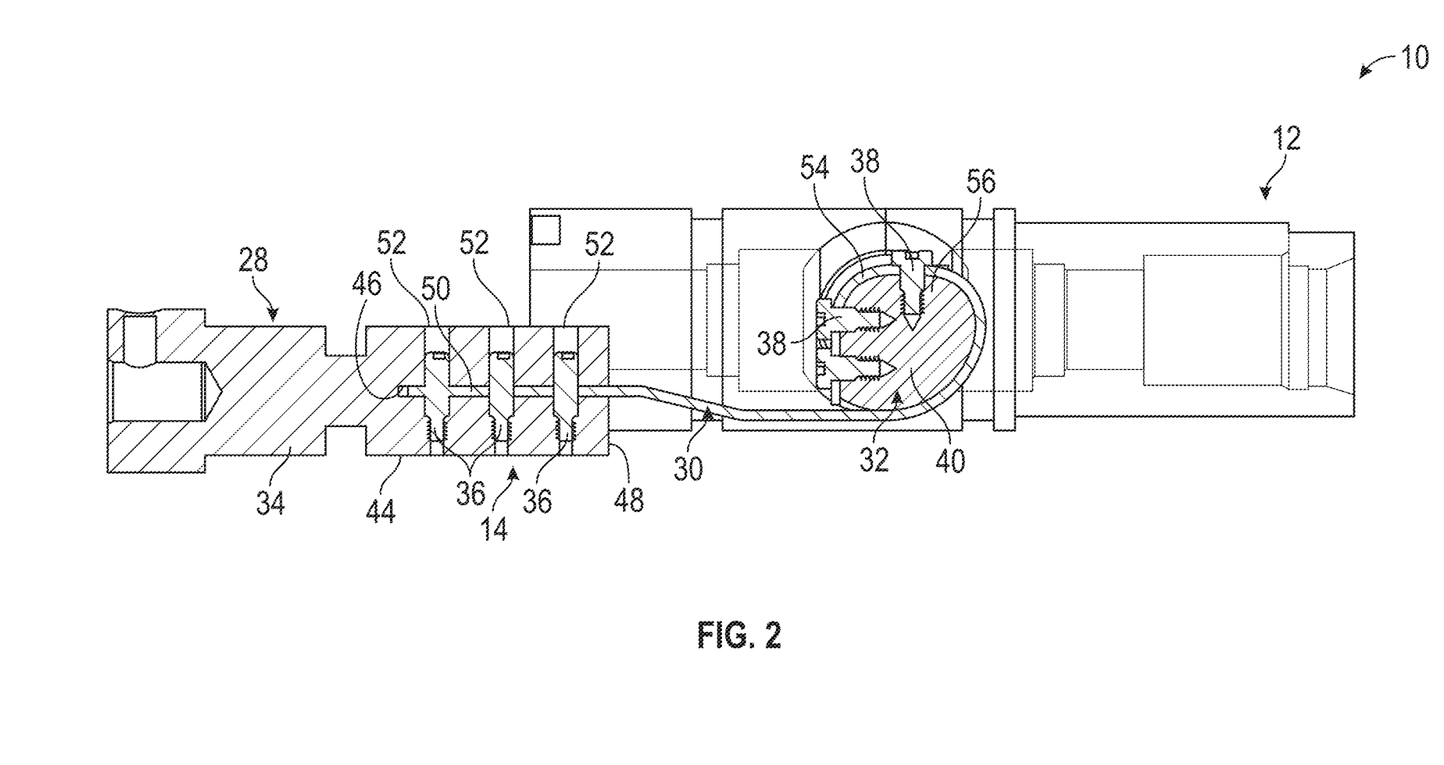
FIG. 2 is a side, cross-sectional view taken along line 2-2 of FIG. 1 in accordance with some embodiments of the present disclosure.

FIG. 2 is a cross-sectional view of the valve system 10 of FIG. 1 taken along line 2-2 in accordance with some embodiments. As illustrated, the valve system 10 includes the valve 12 and the valve actuation assembly 14. In the illustrated embodiment, the valve actuation assembly 14 includes the linear motion actuator 28, cable 30, and actuation shaft 32. The linear motion actuator 28 may include the piston 34. The piston 34 may include a valve connection portion 44 with a slot 46 in longitudinal end 48 of the valve connection portion 44. As illustrated, a first cable end 50 of the cable 30 may be disposed in the slot 46. The first fasteners 36 may be inserted into openings 52 in the valve connection portion 44 to hold the first cable end 50 of the cable 30 in the slot 46.

The cable 30 may extend from the linear motion actuator 28 to the actuation shaft 32. As illustrated, a second cable end 54 of the cable 30 may wrap at least partially around the actuation shaft 32, for example, at least partially around a cammed portion 40 of the actuation shaft 32. For example, the cable 30 may wrap about 90 degrees, about 120 degrees, about 180 degrees, about 270 degrees, or more around the actuation shaft 32. In some embodiments, the cable 30 may wrap from about 90 degrees to about 360 degrees around the actuation shaft 32. As illustrated, the cammed portion 40 may include at least one cammed lobe 56. The cable 30 may wrap at least partially around the cammed lobe 56. As illustrated, the cable 30 may be secured to the shaft with the second fasteners 38. For example, the second fasteners 38 may extend through the cable 30 into the cammed portion 40 of the actuation shaft 32.

Figure 3:
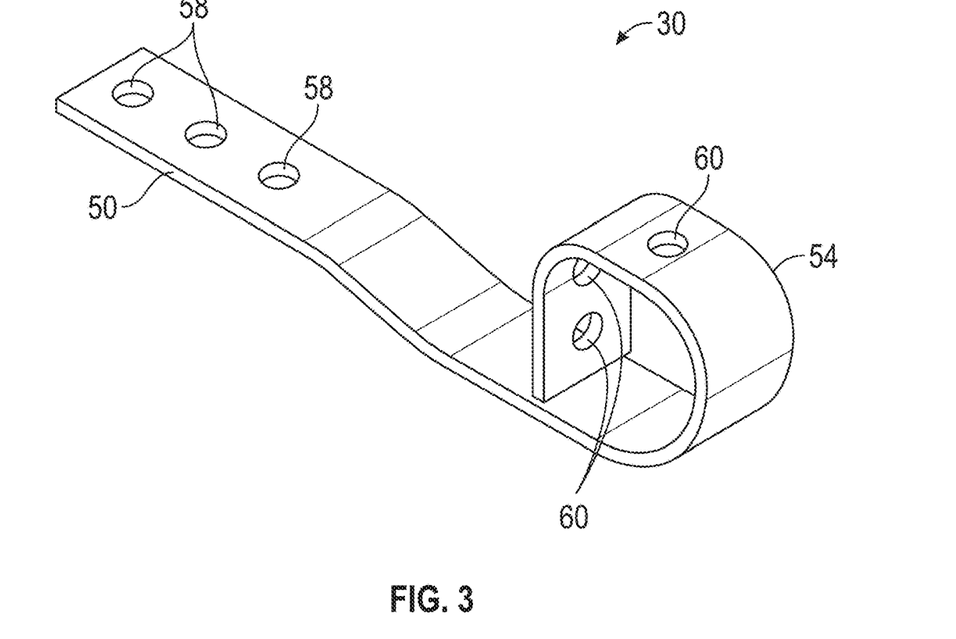
FIG. 3 illustrates a cable for use in a valve actuation system in accordance with some embodiments of the present disclosure.

FIG. 3 illustrates an example of the cable 30 for use with a valve system 10 (e.g., shown on FIGS. 1 and 2) in accordance with some embodiments. As illustrated, the cable 30 may include a first cable end 50 and a second cable end 54. The first cable end 50 may include first openings 58. The first openings 58 may extend all the way through the first cable end 50, as shown on FIG. 3, but alternatively may not extend through the cable 30. The first openings 58 may be configured to receive fasteners (e.g., first fasteners 36 on FIGS. 1 and 2) for securing the cable 30 to an actuator (e.g., piston 34 of valve actuation assembly 14 shown on FIGS. 1 and 2). The second cable end 54 may include second openings 60. The second openings 60 may extend all the way through the second cable end 54, as shown on FIG. 3, but alternatively may not extend through the cable 30. The second openings 6058 may be configured to receive fasteners (e.g., second fasteners 38 on FIGS. 1 and 2) for securing the cable 30 to a shaft (e.g., actuation shaft 32 shown on FIGS. 1 and 2). As illustrated, the second cable end 54 may at least partially wrap around the shaft, such as the actuation shaft 32 shown on FIGS. 1 and 2).

Figure 4:
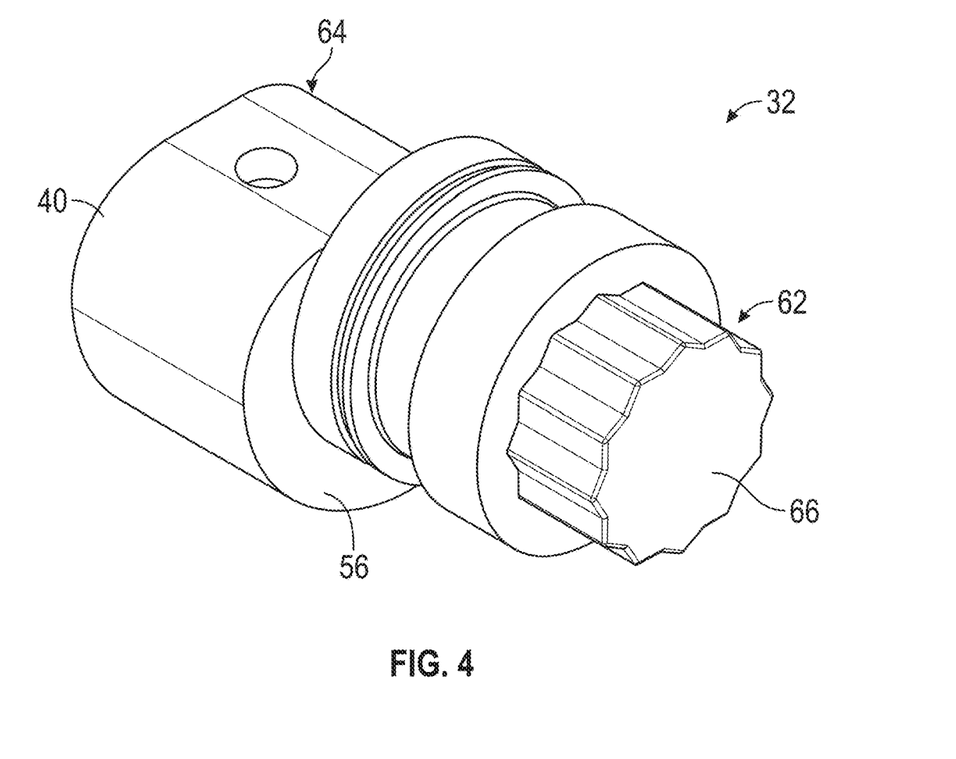
FIG. 4 illustrates a shaft for use in a valve actuation system in accordance with some embodiments of the present disclosure.

FIG. 4 illustrates an example of the actuation shaft 32 for use with a valve system 10 (e.g., shown on FIGS. 1 and 2) in accordance with some embodiments. As illustrated, the actuation shaft 32 may include a first shaft end 62 and a second shaft end 64. The first shaft end 62 may include socket engagement features 66, such as hex features, star features, triangle features, square features, for engagement with a corresponding socket (e.g., socket 76 on ball 16 on FIG. 6). While the first shaft end 62 is shown as being star shaped, it may be otherwise configured, including hex shaped, square shaped, or triangle shaped. The actuation shaft 32 may also include a cammed portion 40 with at least one cammed lobe 56. As illustrated, the cammed portion 40 is shown at the second shaft end 64, but the cammed portion is not necessarily required to be at the second shaft end 64 of the actuation shaft 32. Rather, the cammed portion 40 may be positioned proximate the second shaft end 64 in the middle of the actuation shaft 32 or proximate the first shaft end 62. As previously described, the cable 30 (e.g., shown on FIGS. 1-3) attaches to the actuation shaft 32 at the cammed portion 40 and at least partially wraps around the cammed portion 40. However, this portion where the actuation shaft 32 attached does not necessarily need to be cammed. Rather, attachment portion of the actuation shaft 32 may be cylindrical, square, rectangular, or otherwise configured.

Figure 5:
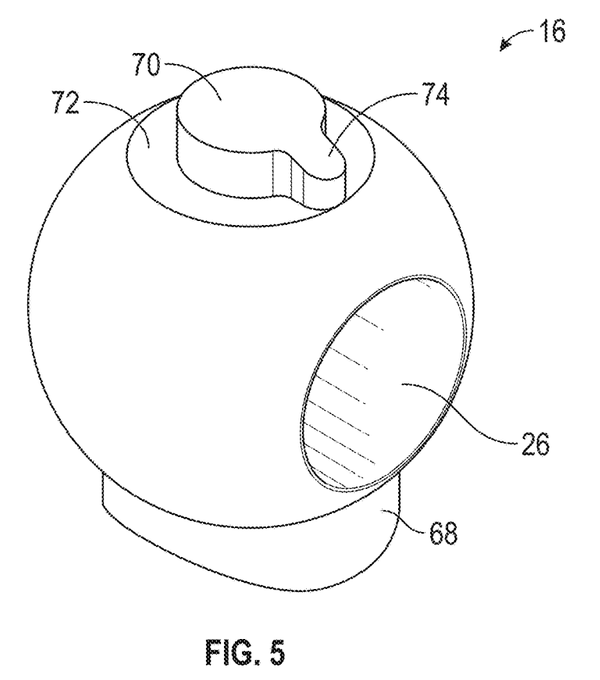
FIG. 5 illustrates a ball for a valve in accordance with some embodiments of the present disclosure.

FIG. 5 illustrates an example of the ball 16 for use with a valve system 10 (e.g., shown on FIGS. 1 and 2) in accordance with some embodiments. As illustrated, the ball 16 may include a ball through bore 26. Accordingly, when the ball 16 is positioned in an open position the ball 16 is positioned in the housing (e.g., valve housing 18 on FIG. 1) to allow passage of fluids through the ball through bore 26 and, when the ball 16 is positioned in a closed position, the ball 16 is positioned in the housing to prevent passage of fluids through the ball through bore 26. As illustrated, the ball 16 may further include a shaft attachment portion 68, as will be discussed in more detail with respect to FIG. 6. The ball 16 further may include a protruding portion 70 that extends from a surface of the ball 16. In the illustrated embodiment, the protruding portion 70 extends from a flat surface 72 on a portion of the ball 16. As illustrated, the protruding portion 70 may extend from the surface on an opposite side of the ball 16 from the shaft attachment portion 68. As illustrated, the protruding portion 70 may include a limit tab 74. The limit tab 74 function to limit rotation of the ball 16, as will be discussed in more detail below with respect to FIG. 7.

Figure 6:
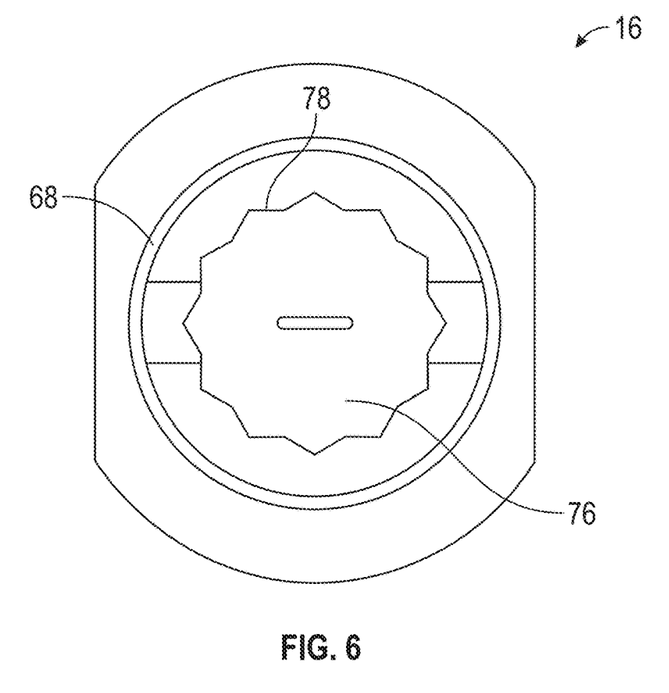
FIG. 6 illustrates another view of the ball of FIG. 5 in accordance with some embodiments of the present disclosure.

FIG. 6 illustrates an example of the ball 16 for use with a valve system 10 (e.g., shown on FIGS. 1 and 2) in accordance with some embodiments. As illustrated, the ball 16 may include a shaft attachment portion 68. In the illustrated embodiment, the shaft attachment portion 68 includes a socket 76 formed in the ball 16. The socket 76 may be configured to receive a portion of the actuation shaft 32 (e.g., shown on FIGS. 1, 2, and 4). The socket 76 may interact with the shaft for transfer of rotational movement from the actuation shaft 32 to the socket 76. As illustrated, the socket 76 may include shaft engagement features 78 that engage corresponding socket engagement features 66 (e.g., hex features, star features, triangle features, square features, etc.) on the actuation shaft 32 (e.g., shown on FIG. 3). As illustrated, the socket 76 may be star shaped. While the socket 76 is shown as being star shaped, it may be otherwise configured, including hex shaped, square shaped, or triangle shaped.

Figure 7:
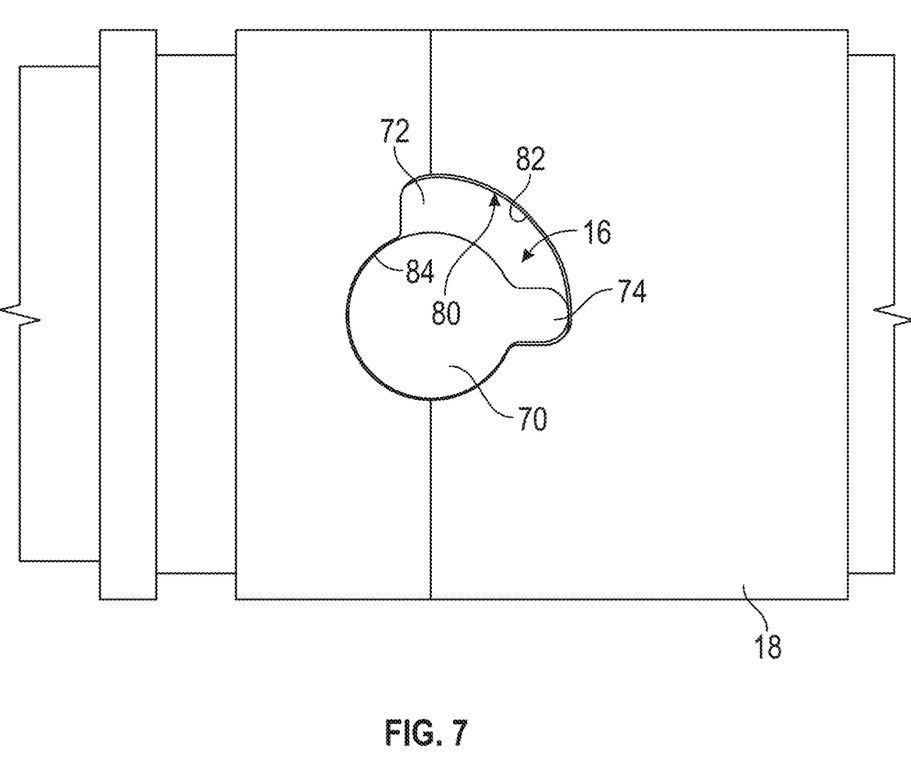
FIG. 7 illustrates a rotation limit in a valve housing in accordance with some embodiments of the present disclosure.

FIG. 7 illustrates interaction of the limit tab 74 of the ball 16 with the valve housing 18 in accordance with some embodiments. As illustrated, the limit tab 74 extends from the flat surface 72 of the ball 16. In the illustrated embodiment, the limit tab 74 extends through a window 80 in the valve housing 18. The window 80 may include a first portion 82 for the protruding portion 70 and a second portion 84. As illustrated, the protruding portion 70 may be positioned in the first portion 82 and the limit tab 74 may be positioned in the second portion 84. As the ball 16 rotates in the valve housing 18, the limit tab 74 also rotates. However, movement of the limit tab 74 is limited by the configuration of the second portion 84. For example, the second portion 84 may be configured as a circular arc. As illustrated, the circular arc has an angle of about 90 degrees. However, the circular arc may be otherwise formed, for example, with an angle of about 45 degrees to about 270 degrees so long as it allowed rotation of the ball 16 from a position to a closed position and/or vice versa.

Figure 8:
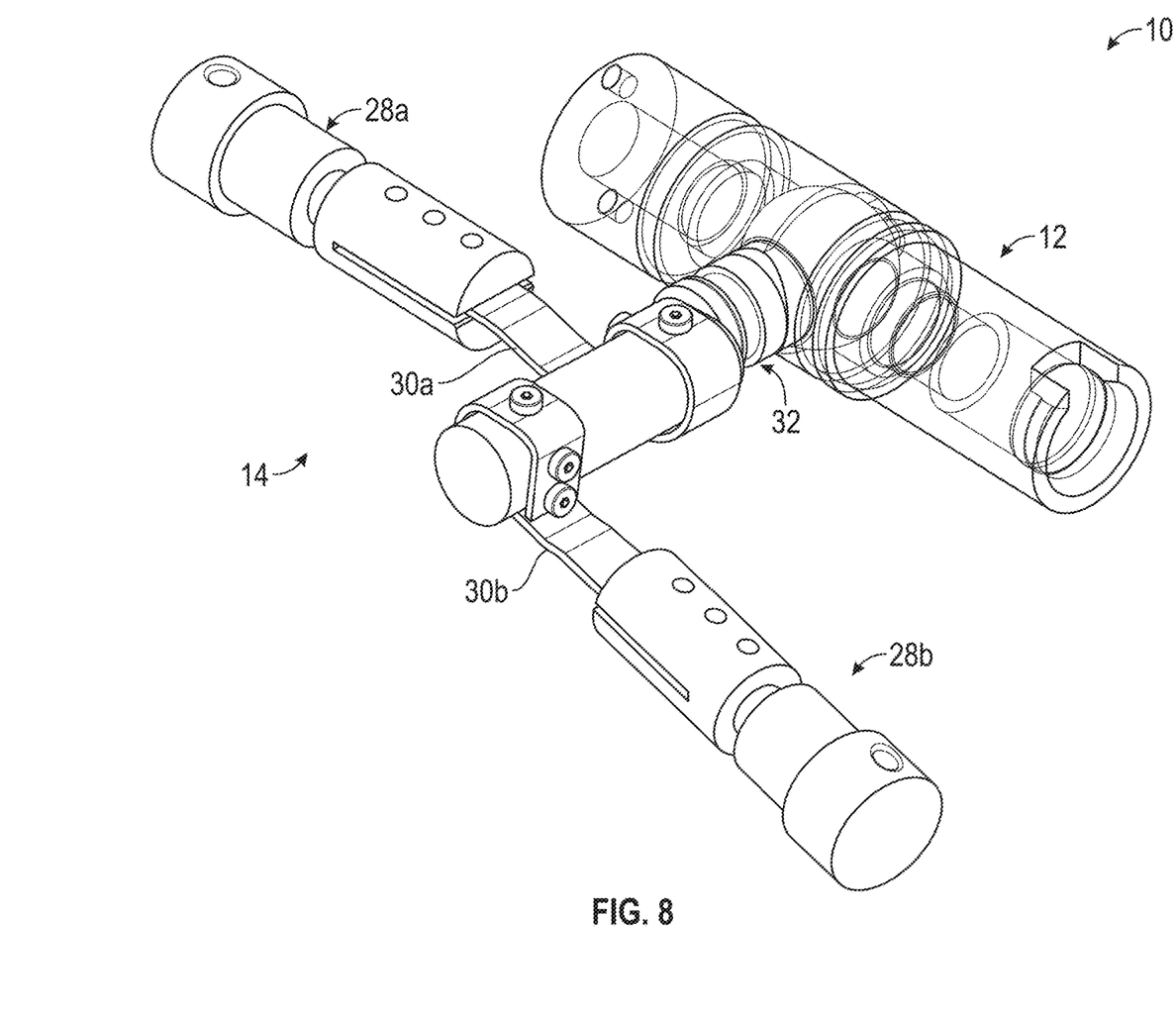
FIG. 8 illustrates another example of a valve system with a valve actuation system for transferring linear motion to rotational motion

FIG. 8 illustrates another example of a valve system 10 As illustrated, the valve system 10 may include a valve 12 and a valve actuation assembly 14. The valve actuation assembly 14 may be configured to convert linear motion to rotational motion for actuation of the valve 12. The valve actuation assembly 14 is similar to the valve actuation system of FIG. 1 except that the valve actuation assembly 14 of FIG. 8 includes an additional linear motion actuator and additional cable, shown on FIG. 8 as second linear motion actuator 28b and second cable 30b. The valve actuation assembly 14 further includes a first linear motion actuator 28a and first cable 30a. The second cable 30b may be at least partially wrapped around the actuation shaft 32 in a direction opposite the first cable 30a. Accordingly, when moved linearly, the second cable 30b should cause the actuation shaft 32 to rotate in a direction opposite to rotation caused by the first cable 30a. In this manner, the first cable 30a may cause rotation of the actuation shaft 32 to close the valve 12 while the second cable 30b may cause opposite rotation of the actuation shaft 32 to open the valve 12 (or vice versa with first cable 30a opening the valve 12 and second cable 30b closing the valve 12).

As previously described, the valve system 10 shown and described on FIG. 1-8 may be used to close and/or open a valve 12 by use of the valve actuation assembly 14. The valve system 10 may be used in any suitable application for valve actuation. In accordance with present embodiments, the valve system 10 may be used in subterranean wells. For example, the valve actuation assembly may be used with a valve to control flow through a flow path in a well tool. Examples of suitable applications include: restricting or allowing flow from the exterior to the interior of a production tubular; restricting or allowing flow between modular screens (e.g., comingled screened annuluses); and/or restricting or allowing flow into or out of washpipe. In some embodiments, the valve 12 may be used to control flow through a packer. For example, a shunt tube may extend through a packer through which flow may be controlled by the valve 12, wherein the valve actuation assembly 14 may be actuated after the gravel pack has been placed and flow through the shunt tubes past a packer is not desirable.

Figure 9:
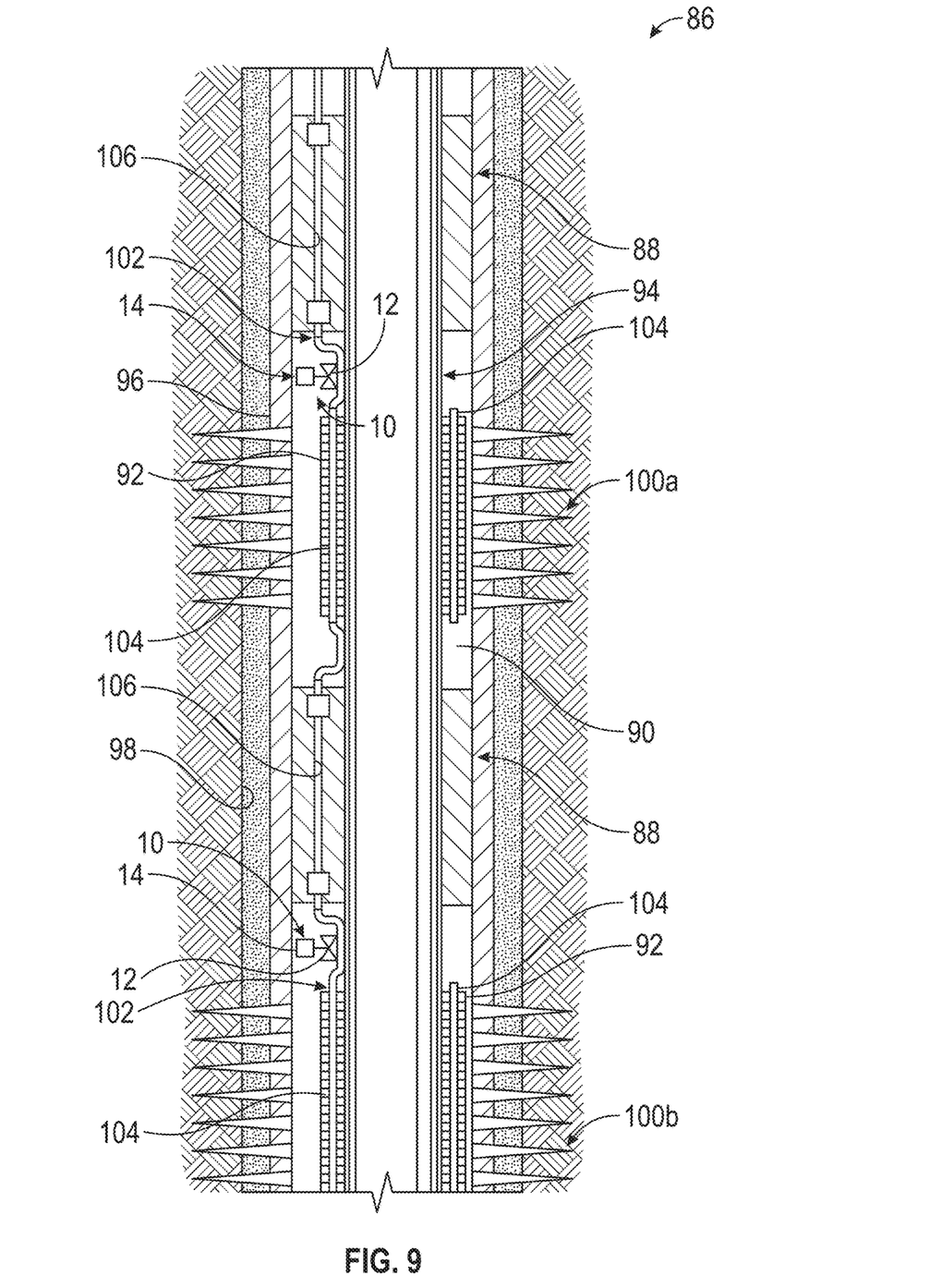
FIG. 9 illustrates a well system that includes valve system with a valve actuation system for transferring linear motion to rotational motion for actuation of a valve in accordance with some embodiments of the present disclosure.

FIG. 9 illustrates a well system 86 that incorporates the valve system 10 in accordance with some embodiments. The well system 86 may include packers 88 that may be used to close off an annulus 90 longitudinally between well screens 92, for example. As illustrated, the annulus 90 may be formed radially between a tubular string 94 and casing 96 lining a wellbore 98. However, if the wellbore 98 were uncased or open hole, then the annulus 90 would be formed between the tubular string 94 and the wellbore 98. Although two well screens 92 and two packers 88 are shown on FIG. 9, for example, for producing from and isolating two formation zones 100a, 100b intersected by the wellbore 98, it should be understood that any number and any combination of screens, packers and zones may be present in a well system embodying principles of this disclosure, any number of screens may be positioned between a pair of packers, and any configuration of these components and the overall system may be used. The principles of this disclosure are not limited in any way to the particular details of the well system 86, packers 88, and well screens 92 shown on FIG. 9.

The well system 86 may further include shunt tube assemblies 102. Shunt tube assemblies, for example, may assist in the even distribution of gravel when a gravel packing operation is performed. As illustrated, the shunt tube assemblies 102 may include shunt tubes 104 extending along the well screens 92 to the packers 88 to connect with packer flow paths 106 extending through the packers 88. Alternatively, the shunt tubes 104 may extend partially or entirely through the packers 88 such that the shunt tubes 104 may at least partially form the packer flow paths 106. Multiple shunt tubes 104 may extend along the well screens 92, and any number or combination of the shunt tubes 104 may be in fluid communication with the annulus 90 on either side of the well screens 92. As illustrated, the shunt tubes 104 may extend through a filter portion of each well screen 92, but the shunt tubes 104 could instead, or in addition, extend external or internal to the well screens 92 and in any position relative to the filter portion or an external shroud of the well screen 92, as desired.

When the gravel packing operation is concluded, it may be desirable for fluid communication through the packers 88 (e.g., through packer flow paths 106) to be prevented. In this manner, complete isolation between the opposite sides of the packers 88 may be obtained. Accordingly, the well system 86 may further include at least one of the valve system 10 (e.g., as shown and described on FIGS. 1-8) in accordance with some embodiments. As illustrated, the valve system 10 may include a valve 12 and a valve actuation assembly 14. In the illustrated embodiments, the valve system 10 may be placed in the shunt tube 104. When closed, the valve should prevent fluid communication through the packers 88. As illustrated, there may be one of the valve systems 10 associated with each of the packers 88.

Accordingly, the present disclosure may provide a valve actuation assembly for converting linear motion to rotational motion for valve actuation in accordance with example embodiments. The methods and systems may include any of the various features disclosed herein, including one or more of the following statements.

Statement 1. A valve system comprising: a valve; and a valve actuation assembly comprising: a linear motion actuator configured to move linearly; a cable coupled to the linear motion actuator; and a shaft coupled to the cable, wherein the cable extends from the linear motion actuator to the shaft, wherein the shaft is configured to rotate and actuate the valve in response to linear movement of the linear motion actuator.

Statement 2. The valve system of statement 1, wherein the valve comprises a valve housing and a ball disposed in the valve housing.

Statement 3. The valve system statement 2, wherein the ball has a protrusion with a limit tab that extends from a surface of the ball through a window in the valve housing, and wherein the limit tab is configured to engage with the valve housing to limit rotation of the ball in the valve housing.

Statement 4. The valve system of any preceding statement, wherein the linear motion actuator comprises a piston.

Statement 5. The valve system of statement 4, wherein the cable has a first cable end and a second cable end, wherein the first cable end is secured in a slot in the piston, and wherein the second cable end is at least partially wrapped around the shaft.

Statement 6. The valve system of any preceding statement, wherein the cable comprises a sheet metal cable.

Statement 7. The valve system of any preceding statement, wherein the cable is flexible such that the cable can rotate the shaft in only one direction.

Statement 8. The valve system of any preceding statement, wherein the cable is at least partially wrapped around the shaft.

Statement 9. The valve system of any preceding statement, wherein the cable is at least partially wrapped around a cammed portion of the shaft.

Statement 10. The valve system of c any preceding statement, wherein the shaft has a first shaft end and a second shaft end, and wherein the first shaft end is coupled to a ball of the valve.

Statement 11. The valve system of statement 10, wherein the cable is at least partially wrapped around a cammed portion of the shaft at the second shaft end.

Statement 12. The valve system of statement 11, wherein the second shaft end is engaged with a socket in the ball.

Statement 13. The valve system of any preceding statement, further comprising an additional linear motion actuator and an additional cable that is coupled to the additional linear motion actuator and the shaft, wherein the additional cable is configured to rotate the shaft in a direction opposite the cable.

Statement 14. A well system comprising: a well tool; a flow path extending through the well tool; a valve disposed in the flow path; and a valve actuation assembly comprising: a linear motion actuator configured to move linearly; a cable coupled to the linear motion actuator; and a shaft coupled to the cable, wherein the cable extends from the linear motion actuator to the shaft, wherein the shaft is configured to rotate and actuate the valve in response to linear movement of the linear motion actuator.

Statement 15. The well system of statement 14, wherein the valve comprises a valve housing and ball disposed in the valve housing.

Statement 16. The well system of statement 14 or 15, wherein the cable comprises a first cable end and a second cable end, wherein the second cable end is at least partially wrapped around the shaft.

Statement 17. The well system of statement 16, wherein the cable is at least partially wrapped around a cammed portion of the shaft at the second cable end, wherein the shaft has a first shaft end and a second shaft end, and wherein the first shaft end is coupled to a ball of the valve.

Statement 18. The well system of any one of statements 14 to 17, wherein the well tool is a packer disposed in an annulus, and wherein the flow path comprises a shunt tube.

Statement 19. A method for valve actuation in subterranean operations, comprising: moving a cable in a wellbore; transferring linear motion of the cable to a shaft coupled to the cable to thereby cause the shaft to rotate; and transferring rotational motion of the shaft to a valve coupled to the shaft to thereby actuate the valve, wherein the valve is disposed in the wellbore.

Statement 20. The method of claim 19, transferring linear motion of the cable to the shaft coupled to the cable comprises at least partially unwrapping the cable from the shaft, and wherein transferring rotational motion of the shaft to a valve coupled to the shaft comprises rotating a ball to shut off flow through a packer, wherein a shunt tube is in communication with a flow path through the packer.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A valve system for use in a wellbore comprising:
   a valve configured to control fluid flow through a shunt tube downhole in a wellbore; and
   a valve actuation assembly comprising:
      a linear motion actuator configured to move linearly;
      a cable coupled to the linear motion actuator; and
      a shaft coupled to the cable, wherein the cable extends from the linear motion actuator to the shaft, wherein the shaft is configured to rotate and actuate the valve in response to linear movement of the linear motion actuator.

2. The valve system of claim 1, wherein the valve comprises a valve housing and a ball disposed in the valve housing.

3. The valve system claim 2, wherein the ball has a protrusion with a limit tab that extends from a surface of the ball through a window in the valve housing, and wherein the limit tab is configured to engage with the valve housing to limit rotation of the ball in the valve housing.

4. The valve system of claim 1, wherein the linear motion actuator comprises a piston.

5. The valve system of claim 4, wherein the cable has a first cable end and a second cable end, wherein the first cable end is secured in a slot in the piston, and wherein the second cable end is at least partially wrapped around the shaft.

6. The valve system of claim 1, wherein the cable comprises a sheet metal cable.

7. The valve system of claim 1, wherein the cable is flexible such that the cable can rotate the shaft in only one direction.

8. The valve system of claim 1, wherein the cable is at least partially wrapped around the shaft.

9. The valve system of claim 1, wherein the cable is at least partially wrapped around a cammed portion of the shaft.

10. The valve system of claim 1, wherein the shaft has a first shaft end and a second shaft end, and wherein the first shaft end is coupled to a ball of the valve.

11. The valve system of claim 10, wherein the cable is at least partially wrapped around a cammed portion of the shaft at the second shaft end.

12. The valve system of claim 11, wherein the second shaft end is engaged with a socket in the ball.

13. The valve system of claim 1, further comprising an additional linear motion actuator and an additional cable that is coupled to the additional linear motion actuator and the shaft, wherein the additional cable is configured to rotate the shaft in a direction opposite the cable.

14. The valve actuation assembly of claim 1, wherein the linear motion actuator comprises a piston with valve connection portion, wherein a slot in a longitudinal end of the valve connection portion receives a first cable end of the cable, and wherein fasteners are inserted through openings in the valve connection portion to hold the first cable end of the cable in the slot.

15. A well system comprising:
   a well tool;
   a flow path extending through the well tool;
   a valve disposed in the flow path; and
   a valve actuation assembly comprising:
      a linear motion actuator configured to move linearly;
      a cable coupled to the linear motion actuator; and
      a shaft coupled to the cable, wherein the cable extends from the linear motion actuator to the shaft, wherein the shaft is configured to rotate and actuate the valve in response to linear movement of the linear motion actuator;
   wherein the well tool is a packer disposed in an annulus, and wherein the flow path comprises a shunt tube.

16. The well system of claim 15, wherein the valve comprises a valve housing and ball disposed in the valve housing.

17. The well system of claim 15, wherein the cable comprises a first cable end and a second cable end, wherein the second cable end is at least partially wrapped around the shaft.

18. The well system of claim 17, wherein the cable is at least partially wrapped around a cammed portion of the shaft at the second cable end, wherein the shaft has a first shaft end and a second shaft end, and wherein the first shaft end is coupled to a ball of the valve.

19. A method for valve actuation in subterranean operations, comprising:
   moving a cable in a wellbore;
   transferring linear motion of the cable to a shaft coupled to the cable to thereby cause the shaft to rotate; and transferring rotational motion of the shaft to a valve coupled to the shaft to thereby actuate the valve, wherein the valve is disposed in the wellbore.

20. The method of claim 19, transferring linear motion of the cable to the shaft coupled to the cable comprises at least partially unwrapping the cable from the shaft, and wherein transferring rotational motion of the shaft to a valve coupled to the shaft comprises rotating a ball to shut off flow through a packer, wherein a shunt tube is in communication with a flow path through the packer.

* * * * *